United States Patent [19]
Brewer

[11] 3,741,268

[45] June 26, 1973

[54] QUICK CHANGE PNEUMATIC TIRE

[76] Inventor: Howell K. Brewer, 1921 N. Longview Street, Dayton, Ohio 45432

[22] Filed: Dec. 14, 1971

[21] Appl. No.: 207,849

[52] U.S. Cl. .............................................. 152/175
[51] Int. Cl. ............................................. B60c 7/12
[58] Field of Search................... 152/187, 175, 176

[56] References Cited
UNITED STATES PATENTS

| 3,578,052 | 5/1971 | Petersons | 152/187 |
| 3,034,554 | 5/1962 | Noble et al. | 152/187 |

Primary Examiner—James B. Marbert
Attorney—Harry A. Herbert, Jr. et al.

[57] ABSTRACT

A vehicular tire having integral tread and carcass portions molded into a closed, toroidal configuration and further formed into a convoluted shape, when uninflated, both for providing and facilitating its stretching over the outside diameter of a mounted wheel, and for positively controlling and urging movement of the carcass-inside diameter in an inward contracting direction only to a gripping position with either the specially contoured wheel rim or adapter ring element mounted thereto.

8 Claims, 6 Drawing Figures

QUICK CHANGE PNEUMATIC TIRE

BACKGROUND OF THE INVENTION

This invention relates generally to the field of technology concerning techniques for replacing vehicular tires and, in particular, to an improved means for quick-changing tires while preferably leaving the wheel still mounted to the vehicle.

In re-equipping various vehicles, including but not restricted to aircraft, with replacement tires, it has been the general practice, heretofore, to initially dismount the wheel and tire as a unit, remove the old tire from the wheel usually with the laborious use of certain tire-changing equipment, install the new or retreaded tire on the wheel, again with the same equipment, and, finally, remount the wheel and replacement tire to the vehicle. The above-outlined steps naturally involves an expenditure of considerable time and effort and, therefore, any new technique of tire-changing that would significantly decrease the time and effort required either by eliminating one or more of the usual steps, as outlined hereinbefore, or by speeding-up the time and reducing the effort involved in performing such steps would be most desirable. In this connection, where only the tread portion of the tire needs replacing, a replaceable-type of tread could be utilized, such as has been already described and claimed in a U.S. Pat. application, Ser. No. 760,931, filed Sept. 19, 1968, by Mr. Aivars V. Petersons, on an invention entitled, "Replaceable Tread On An Expanding Diameter Carcass Tire," later issued on May 11, 1971 as U.S. Pat. No. 3,578,052. Another example of the use of a separate tire tread is that described and claimed in a copending U.S. Pat. application, Ser. No. 207,850 filed on Dec. 14, 1971, on a related invention made jointly by Messrs. Howell K. Brewer and Aivars V. Petersons and entitled, "Quick Change-Replaceable Tread Pneumatic Tire." However, the new and improved tire assembly of the present invention, to be further described hereinafter in the following summary and detailed description thereof, was specifically developed for use where the tire to be replaced incorporates integral tread and carcass portions.

SUMMARY OF THE INVENTION

The present invention consists briefly in a pneumatic-type of tire assembly that incorporates an integral tread portion and a carcass portion formed into a closed toroid and, further, made into a convoluted configuration that enables and ensures that the uninflated carcass can be easily stretched and slipped over the outside diameter of the still-mounted wheel either for ready assembly thereto, or disassembly therefrom. The convoluted form of the carcass further uniquely provides and ensures that, on the application of an inflation pressure into the closed carcass, the inside diameter of the latter will only contract inwardly towards a position of gripping contact with, and assembly to, either the wheel-rim portion per se, or to an adapter ring element positioned on the said rim portion. In either event, the upper surface of either the rim portion or the adapter ring element may preferably be specially contoured with a concave-like shape that is specifically and uniquely operative, both to minimize the stresses normally developed by the said surface preventing the tire carcass from assuming its natural, inflated shape and, at the same time, being inherently operative to maximize the gripping force between the tire and wheel-rim portion, or adapter ring element.

Other advantages, as well as objects, of the present invention will become readily apparent hereinafter in connection with the following disclosure and accompanying drawings, in which;

DESCRIPTION OF THE PREFERRED EMBODIMENT

Figure 1:
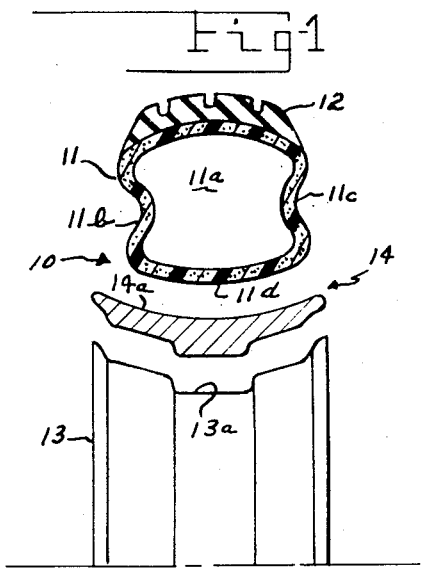
FIG. 1 represents an exploded view, partly schematic and cross-sectioned, illustrating the uninflated condition of the improved quick change tire and wheel assembly of the present invention, and with the novel adapter ring element being used therewith.
Figure 2:
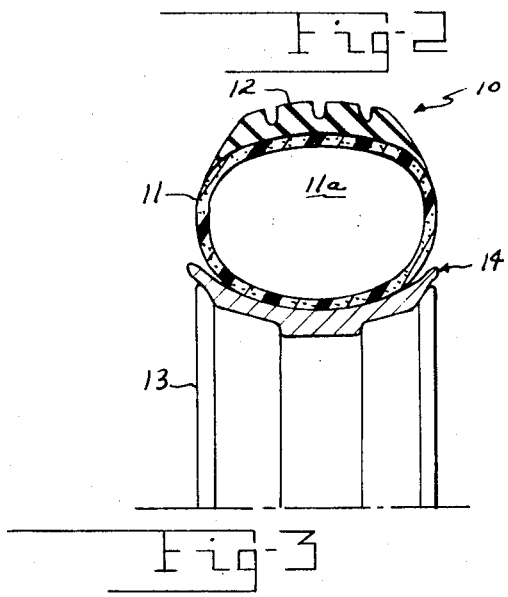
FIG. 2 represents an assembled view, partly schematic and cross-sectioned, illustrating the inflated condition of the improved quick change tire and wheel assembly of FIG. 1.

Referring generally to the drawings and, in particular, to FIGS. 1 and 2 thereof, it is clearly seen that the new and improved quick-change pneumatic tire of the present invention, indicated generally at the reference numeral 10, consists of the principal components of a preferably rubber tire carcass 11, an integral tread portion 12, and a standard type of vehicle wheel 13 having a rim portion, at 13a (FIG. 1), that may uniquely and preferably incorporate a novel adapter ring element 14 in mounted relation thereto, as seen more clearly in the assembled view of FIG. 2, for a specific purpose to be further described hereinafter. The aforesaid rubber tire casing 11 may be constructed of any of a number of well-known cord-reinforced structures that are sufficient to withstand or sustain an inflation pressure by itself and, therefore, in the absence of a wheel. The reinforcing means may be comprised of a textile, steel, glass or other suitable material; however, neither its specific method of manufacture, nor the precise form of the cord, whether comprising continuous filaments or discontinuous strands, is of importance to the present invention and, therefore, further details thereof are neither described nor illustrated. In this regard, it is noted that it is a mere matter of design choice as to which of the currently available cord-reinforced structures should be utilized for the tire carcass 11.

The aforementioned tire carcass 11 is, in accordance with the novel teachings of the present invention, molded into a closed-type of configuration and thereby forms a closed and sealed interior vessel or chamber, at 11a, into which may be introduced a supply of compressed gas, as air, in a well-known manner for inflating and thus assembling the tire carcass 11 on the wheel 13. In addition to being formed into a closed configuration and incorporating the previously noted sealed vessel or chamber 11a, the wall surfaces of which comprising part of the tire carcass 11 and therefore of a strength sufficient to sustain an inflation pressure introduced therein, the said carcass 11 may be further and uniquely molded and cured into a toroidal shape that is still further uniquely made convoluted in form, when in the uninflated condition illustrated in FIG. 1. The aforementioned convoluted shape, which forms, perhaps, the key feature of the present invention, is seen clearly in the aforesaid FIG. 1 as having the very important result of causing the said tire carcass 11 to assume a naturally collapsed, inner condition or, in other words, to substantially bow inwardly at the opposed side wall areas thereof, as is generally indicated at the reference numerals 11b and 11c. This collapsed configuration, due to and specifically provided for by the convoluted shape of the tire carcass 11, performs a twofold function. First, it positively ensures that the uninflated tire carcass 11 may be rather easily stretched outwardly a significant amount to an extended position, whereby the previous, substantially collapsed condition thereof has all but been eliminated, and thereafter slipped over the outside diameter of the wheel 13. Also, on deflation of the tire carcass 11, as when it is desired to remove a previously mounted tire for its replacement, a similar stretching of the said tire carcass 11, again, for slipping over the wheel-outside diameter for its removal therefrom in the opposite direction is likewise relatively easily accomplished in most instances.

Figure 4:
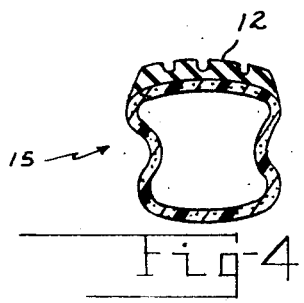
FIGS. 4, 4a and 4b respectively depict representative examples of typical cross-sectional shapes or meridian profiles in which the novel convolutions of the tire carcass of the present invention may be uniquely configured.
Figure 4A:
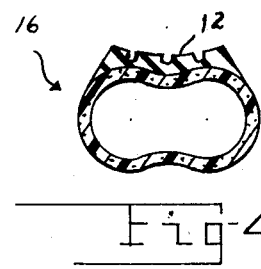
Figure 4B:
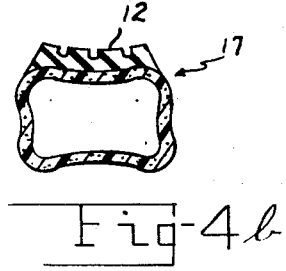

Actually, in the preferred form of the invention of FIGS. 1 and 2, the tire carcass 11 is preferably installed and slipped over the previously referred to adapter ring element 14. For this purpose, the latter element may be made into a cylindrical configuration that is expressly designed with a contoured or concaved upper, tire carcass-seating surface, indicated at 14a in FIG. 1. In this connection, the uninflated cross-section or meridian shape of the convoluted tire carcass 11 may be comprised of any one of a number of typical, plane convoluted closed curves, such as is depicted, for example, generally at the reference numerals 15, 16 and 17 in FIGS. 4, 4a and 4b, respectively, which meridian profiles 15, 16, 17 also illustrate the integral tread portion 12 formed thereto. In any event, one novel purpose of molding the tire carcass 11 into a closed, toroidal and, particularly convoluted shape, as hereinbefore noted, is to provide the previously described built-in ability of the uninflated tire carcass 11 to be easily stretched and therefore readily slipped over, and thereby installed to, and/or disassembled from, the outside diameter of the specially contoured adapter ring element 14.

The second novel function inherently involved in molding and curing the closed and toroidal tire carcass 11 into a convoluted shape is to further specifically ensure that, on applying an inflation pressure into the closed inner vessel or chamber 11a formed therein, the inside diameter surface, indicated at 11d, of said tire carcass 11 will automatically contract only in an inward direction a substantial amount sufficient for it to grip in tight-fitting relation against the previously described upper, contoured surface 14a of the adapter ring element 14. The previously noted contoured configuration of the adapter ring element upper surface 14a specifically acts both to uniquely minimize the stresses developed by preventing the tire from assuming its natural, inflated shape and, at the same time, maximizing the gripping force between the tire carcass 11 and the adapter ring element 14. The latter is, of course, also specially shaped or contoured on its lower surface to thereby exactly match with, and precisely accommodate the standard wheel-rim portion 13a, particularly illustrated in FIG. 1. Said ring element 14 may be so installed on the wheel-rim portion 13a either by using a force-fit or any of a number of well-known mechanical attachment means, such as bolts, screws, keys and the like.

Figure 3:
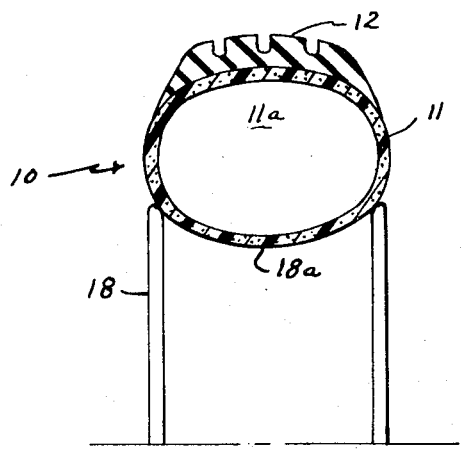
FIG. 3 illustrates another assembled view, partly schematic and cross-sectioned, showing the inflated condition of the improved quick change tire and wheel assembly of the invention, but with the adapter ring element of the inventive form of FIGS. 1 and 2 being omitted therefrom.

Alternatively, instead of using the aforementioned adapter ring element 14, the wheel itself may incorporate a rim portion that has a specially contoured upper surface, as is indicated at 18a in FIG. 3 for the wheel 18. In either event, the tire carcass 11 of the present invention offers the unique advantages of ensuring the rapid installation and/or quick-change of a new or retreated tire on a vehicular wheel, because of its inherent convoluted shape and thus ability to be easily and quickly stretched, when uninflated, over the outside diameter of the specially contoured adapter ring element, as at 14, or, alternatively, the specially contoured wheel-rim portion, as at 18a. Moreover, its convoluted and closed vessel-configuration further uniquely and automatically assures that the tire carcass-inside diameter 11d (FIG. 1) will only move by contraction inwardly to a gripping relation with the said adapter ring element 14 or specially contoured wheel-rim portion 18a. Furthermore, because of its inherent stretching capability, when uninflated and/or deflated, the necessity of first dismounting the wheel when changing tires because of puncture, wear or any other reason has been all but eliminated in many instances. Even in those applications where it is considered desirable or even, perhaps, essential to first remove the wheel because of a particular installation; nevertheless, the improvement of the present invention still offers significant advantages over other, more generally used techniques, in its inherent capability for rather easy removal from, and assembly to, either the specially contoured adapter ring element 14 or the modified wheel-rim portion 18a. With either method, considerable savings in time and effort is the inevitable result.

The foregoing new and improved quick-change means of the invention further solves or, at least substantially alleviates the problem of wheel flange failures due to fatigue, by uniquely transferring the loads normally causing such fatigue failures from the beads of normal-types of tires to an internal reaction within the closed toroidal structure of the carcass 11.

I claim:

1. In means for replacing a pneumatic tire installed on a vehicular wheel; a quick-change tire assembly comprising; a first, tread portion; a second, carcass-peripheral portion disposed inwardly of, and in integral, supporting relation to said first, tread portion; and a third, carcass-main wall portion integrally supporting and intermediately disposed between said carcass-peripheral portion and the vehicular wheel; said third, carcass-main wall portion comprising opposed side wall surfaces respectively supporting said peripheral portion and adjustable between a first, substantially inwardly disposed, collapsed position, when in its uninflated condition, and stretchable to a second, substantially non-collapsed, and wall surface-extensible and outwardly disposed position to thereby place the second, carcass-peripheral portion in assembled relation over the outside diameter of, and to said vehicular wheel.

2. In means for replacing a pneumatic tire installed on a vehicular wheel as in claim 1, wherein said third, carcass-main wall portion further comprises an inside diameter-surface portion simultaneously movable to a contacting relation with the vehicular wheel on the adjustment of said second, carcass-peripherial portion in assembled relation over said wheel.

3. In means for replacing a pneumatic tire installed on a vehicular wheel as in claim 1, wherein said third, carcass-main wall portion further comprises a closed, inside diameter-surface portion forming a sealed, vessel interiorily disposed in said tire carcass and constituting the inflation chamber therefor.

4. In means for replacing a pneumatic tire installed on a vehicular wheel as in claim 1, wherein said second and third, carcass-peripheral and main wall portions comprise a cord-reinforced casing molded into a closed toroid and thereby forming a sealed, inner vessel capable of sustaining air pressure by itself.

5. In means for replacing a pneumatic tire installed on a vehicular wheel as in claim 4, wherein said cord-reinforced casing is made convoluted in form and further comprises a closed, inside diameter-surface portion integrally formed to the opposed side wall surfaces of said third, carcass-main wall portion and automatically adjustable in an inward-contracting relation to a tight-fitting gripping relation with the vehicular wheel, on the application of an inflation pressure within the said sealed, inner vessel formed within said casing.

6. In means for replacing a pneumatic tire installed on a vehicular wheel as in claim 2, wherein said vehicular wheel incorporates a specially contoured element for both ensuring a gripping contact, with maximum force, between the inside diameter-surface portion of said third, carcass-main wall portion and said wheel, and minimizing the stresses normally developed by the inward contraction of said inside diameter-surface portion against said wheel.

7. In means for replacing a pneumatic tire installed on a vehicular wheel as in claim 6, wherein said specially contoured element comprises the rim portion of the wheel.

8. In means for replacing a pneumatic tire installed on a vehicular wheel as in claim 6, wherein said specially contoured element comprises an adapter ring element positioned on the rim of a standard wheel.

* * * * *